(12) United States Patent
Shoshan

(10) Patent No.: US 11,068,947 B2
(45) Date of Patent: Jul. 20, 2021

(54) MACHINE LEARNING-BASED DYNAMIC OUTCOME-BASED PRICING FRAMEWORK

(71) Applicant: SAP SE, Walldorf (DE)

(72) Inventor: Itzhak Shoshan, Even Yehuda (IL)

(73) Assignee: SAP SE, Walldorf (DE)

( * ) Notice: Subject to any disclaimer, the term of this patent is extended or adjusted under 35 U.S.C. 154(b) by 75 days.

(21) Appl. No.: 16/428,190

(22) Filed: May 31, 2019

(65) Prior Publication Data
US 2020/0380573 A1 Dec. 3, 2020

(51) Int. Cl.
G06Q 30/02 (2012.01)
G06N 20/00 (2019.01)
G06N 5/04 (2006.01)

(52) U.S. Cl.
CPC .......... *G06Q 30/0283* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,618,742 B1* | 9/2003 | Krum | ...................... | G06F 9/505 702/186 |
| 7,970,829 B2 | 6/2011 | Shoshan et al. | | |
| 9,491,112 B1* | 11/2016 | Patel | ...................... | G06F 9/5005 |
| 9,930,026 B2 | 3/2018 | Shoshan | | |
| 2003/0163378 A1* | 8/2003 | Podgurny | ........... | G06F 3/04847 705/26.1 |
| 2008/0125122 A1* | 5/2008 | Zhou | .................. | G06Q 30/0206 455/436 |
| 2009/0048880 A1 | 2/2009 | Shoshan | | |
| 2009/0112608 A1* | 4/2009 | Abu-Hakima | ..... | G06Q 30/0242 705/345 |
| 2010/0145833 A1* | 6/2010 | Hamilton, II | .......... | G06Q 20/04 705/30 |
| 2011/0173084 A1* | 7/2011 | Cheng | ................ | G06Q 30/0601 705/26.1 |
| 2012/0240113 A1* | 9/2012 | Hur | ...................... | G06F 9/45558 718/1 |
| 2013/0151320 A1* | 6/2013 | Szrek | .................. | G07F 17/3255 705/14.14 |

(Continued)

OTHER PUBLICATIONS

U.S. Appl. No. 16/219,329, Shoshan, filed Dec. 13, 2018.

*Primary Examiner* — Sujay Koneru
(74) *Attorney, Agent, or Firm* — Fish & Richardson P.C.

(57) ABSTRACT

A service request is received at an intelligence service server from a user, where the service request includes a number of required inputs associated with the user. The number of required inputs are executed by the intelligence service server to generate an inference, an outcome probability distribution and a price quote, where the price quote corresponds to the outcome probability distribution. The outcome probability distribution and the price quote are returned by the intelligence service server to the user. It is determined by the intelligence service server that whether the user accepts the price quote based on a response from the user. If so, the inference is returned by the intelligence service server to the user. Otherwise, the response from the user is logged in a database associated with the intelligence service server by the intelligence service server.

17 Claims, 4 Drawing Sheets

(56) References Cited

U.S. PATENT DOCUMENTS

| | | | |
|---|---|---|---|
| 2013/0238751 A1* | 9/2013 | Raleigh | H04L 67/26 709/217 |
| 2014/0006075 A1 | 1/2014 | Shoshan et al. | |
| 2014/0101013 A1* | 4/2014 | Baset | G06Q 40/00 705/35 |
| 2014/0156343 A1* | 6/2014 | Olsen | G06Q 10/067 705/7.29 |
| 2014/0200947 A1* | 7/2014 | Gujar | H04L 67/02 705/7.26 |
| 2014/0214496 A1* | 7/2014 | Macbeath | G06Q 30/0283 705/7.37 |
| 2015/0088541 A1* | 3/2015 | Yao | G16H 20/00 705/2 |
| 2015/0347940 A1* | 12/2015 | Doganata | G06Q 10/06311 705/7.13 |
| 2015/0381595 A1 | 12/2015 | Shoshan et al. | |
| 2016/0012465 A1* | 1/2016 | Sharp | G06Q 20/384 705/14.17 |
| 2016/0239906 A1* | 8/2016 | Kruglick | G06Q 30/0202 |
| 2016/0335562 A1* | 11/2016 | Zeng | G06F 16/182 |
| 2017/0149627 A1* | 5/2017 | Blondeau | H04L 41/5016 |
| 2017/0154347 A1* | 6/2017 | Bateman | G06Q 40/08 |
| 2017/0161758 A1* | 6/2017 | Towriss | G06Q 30/0201 |
| 2018/0107508 A1* | 4/2018 | Goyal | G06F 9/5011 |
| 2018/0121829 A1* | 5/2018 | Chowdhary | G06Q 30/02 |
| 2018/0349324 A1* | 12/2018 | Krappe | G06Q 30/0283 |
| 2019/0268283 A1* | 8/2019 | Mukherjee | H04L 47/746 |
| 2019/0339688 A1* | 11/2019 | Celia | G05B 19/41865 |
| 2020/0151640 A1* | 5/2020 | Chen | G06Q 10/06 |
| 2020/0259721 A1* | 8/2020 | Kopiychenko | H04L 41/5051 |
| 2020/0279199 A1* | 9/2020 | Dasgupta | G06Q 10/0631 |

\* cited by examiner

MACHINE LEARNING-BASED DYNAMIC OUTCOME-BASED PRICING FRAMEWORK

BACKGROUND

Cloud computing technologies allow customers to process, store and manage data without installing different software. A cloud-computing provider can offer many online services based on a Service Level Agreement between the provider and the customer. Before such services can be offered, a pricing model is agreed upon between the service provider and the customer. Price is an important factor for an organization which provides cloud services because it can affect customers directly and impact overall organizational profit. A pricing model in cloud computing is more flexible than traditional models, where every cloud provider can has its own pricing scheme for cloud-based services based on varying business models and technology frameworks. The key issue of selecting and evaluating differing business models is how price and costs are measured, accounted for, and distributed between different service layers and responsible organizational units.

SUMMARY

The present disclosure describes methods and systems, including computer-implemented methods, computer program products, and computer systems for a machine learning (ML)-based dynamic outcome-based pricing (dOBP) framework.

In an implementation, a service request is received at an intelligence service server from a user, where the service request includes a number of required inputs associated with the user. The number of required inputs are executed by the intelligence service server to generate an inference, an outcome probability distribution and a price quote, where the price quote corresponds to the outcome probability distribution. The outcome probability distribution and the price quote are returned by the intelligence service server to the user. It is determined by the intelligence service server that whether the user accepts the price quote based on a response from the user. If it is determined that the user accepts the price quote, the inference is returned by the intelligence service server to the user. If it is determined that the user declines the price quote, the response from the user is logged in a database associated with the intelligence service server by the intelligence service server.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. The proposed framework provides a pricing mechanism that is based on the value of the service, which is measured from the perspective of the customers, thereby increasing the service quality and improving the customer satisfaction, and further expanding a customer basis. Further, the proposed framework collects and retains real-time customers' feedbacks, and this instant feedback data is used to train the ML model used in the framework, improving the performance of the ML algorithm to make more accurate predictions. In addition, because the proposed framework can gain a better understanding of the service data and data associated with individual customers, such data can be stored, retrieved, and processed in a more efficient way, reducing the data processing time and data storage space in the cloud computing system.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
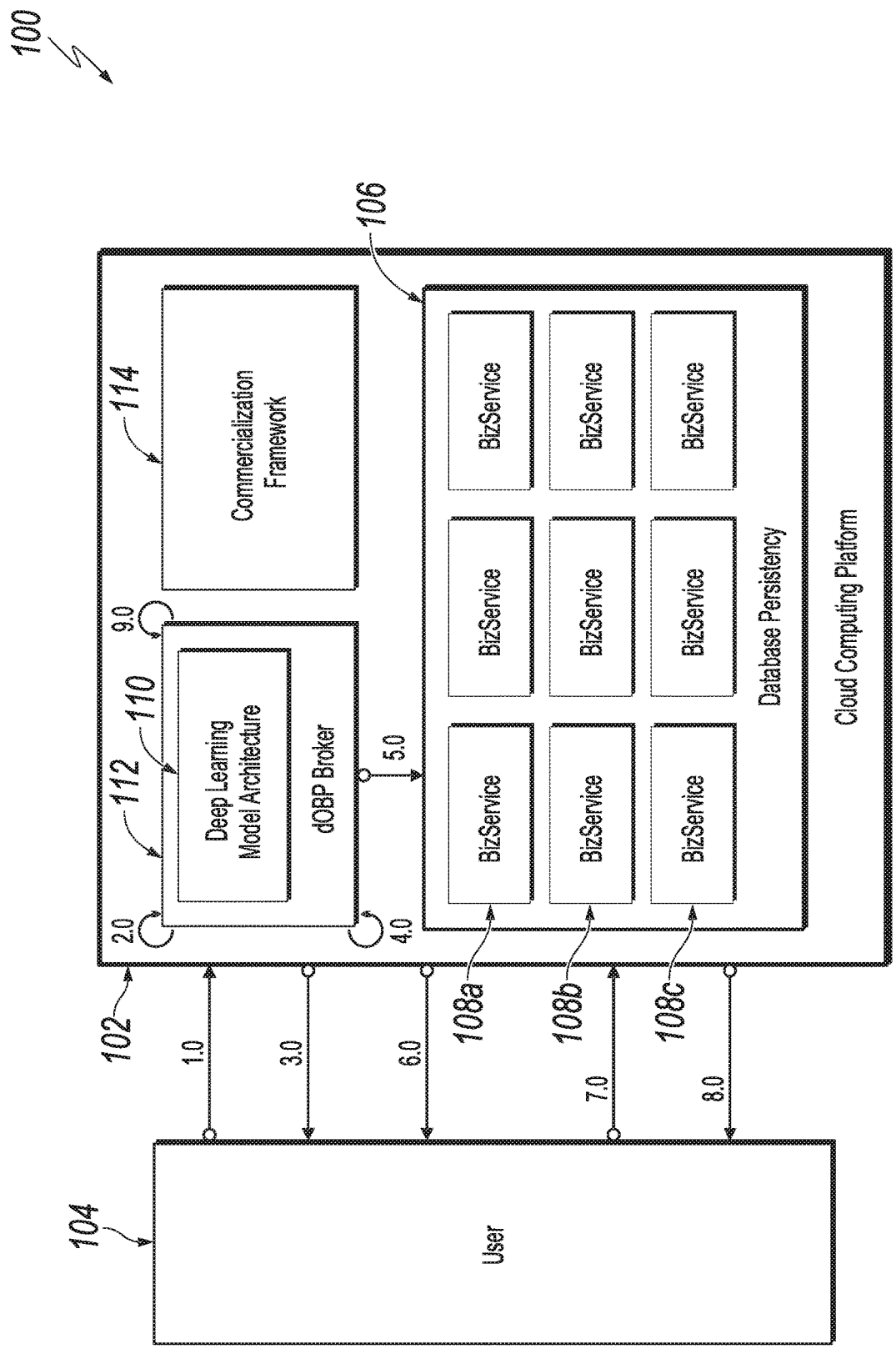
FIG. 1 is an example diagram illustrating components/data relationship of a machine learning (ML)-based dynamic outcome-based pricing (dOBP) framework, according to some implementations of the present disclosure.

The following detailed description describes a machine learning (ML)-based dynamic outcome-based pricing (dOBP) framework and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Pricing in cloud computing has its root in system design and optimization. There are various pricing schemes depending on particular cloud service providers. The overall challenge for cloud service providers is to provide good service for a reasonable price to users. A first category of pricing schemes is fixed pricing, where each service provider defines a price for customers. Because the price is fixed by the service provider, this type of pricing scheme can lead to a reduced customer base and an overall decrease in revenue and profits. Fixed pricing includes pricing mechanisms such as perpetual software licensing, subscription, and pay-per-use (PPU). A perpetual software license is a type of software license that authorizes an individual to use a program indefinitely with an upfront payment of a single fee for a license. After the supported period ends, the customer has the option of continuing to use the current version of the software without additional support or paying a lower-cost fee to re-subscribe for support and upgrades. In subscription pricing, users pay on a recurring basis to access software (for example, as an online service). The customer subscribes to use a preselected combination of service units for a fixed price and for a longer time frame (such as, monthly or annually). For example, Microsoft™ Azure™ charges customers a subscription fee on a monthly basis for a database. In PPU, users pay for what is used (such as, based on a function of time or quantity consumed on a specific service). For example, Amazon™ Web Service charges customers on a basis of per-transferred gigabyte (GB) of data. As another example, SAP™ Cash App charges customers per transaction without any correlation to an outcome of the provided service (that is, the charges are the same whether the transaction leads to an accurate prediction or not).

A second category of pricing scheme is called dynamic pricing. In dynamic pricing, a price is calculated based on a pricing mechanism when a request occurs. In some cases, a price of resources is determined according to supply-and-demand or other criteria. Compared to fixed prices, dynamic pricing reflects a real-time supply-and-demand relationship and represents a pricing strategy better able to exploit user payment potentials and, thus, larger profit gains for a cloud service provider. There are many different types of dynamic pricing schemes. For example, a particular pricing scheme uses a model that is based on real-time pricing of a market. At present, there is a trend of using an outcome-based pricing (OBP) scheme, which allows a customer to pay differently for the same service based on a value of the service delivered to the customer. That is, customers demand pricing schemes that are better correlated to delivered value of a service or a product that they actually consume.

Notably, the OBP scheme does not replace existing pricing tools entirely, but is a recent scheme which works well for some specific scenarios. For example, when a vendor is uniquely positioned to provide an offering (a "differentiating offering" scenario) leveraging proprietary technology or unique data; when a service could drive new customer revenue ("high-value offering" scenario); when vendor transactional cost is low ("low marginal cost" scenario); when an outcome of a service is isolated from external influencing factors ("isolated transaction" scenario). Using hedge funds as an example. A hedge fund normally charges customers a management fee (that is, a "subscription") plus a performance fee. Different hedge fund managers charge different amounts of fees based on performance track records and reputations ("differentiating offering"). A service offered can generate large profits for its customers with relatively low risk ("high-value offering"). For each hedge fund, managing more customers or more funds add no additional cost ("low marginal cost"). The outcome of the service is 100% correlated to the transaction ("isolated transaction").

This disclosure describes a dynamic OBP scheme similar to a conventional OBP scheme, but where a price is calculated dynamically for every occurrence. A ML Classification model provides as an output a list of classes and a probability of each class. An outcome with high probability is much more valuable than an outcome with a distribution of multiple low probabilities. The essence of the idea is to leverage outcome probability to dynamically price a transaction, rather than using flat effort-based pricing. Specifically, a vendor executes a prediction and responds to a customer with an outcome distribution and price. If the customer accepts the price, a list of classes associated with probabilities is received. The vendor then logs the customer response and learns a proper price for each prediction. Optionally, if a prediction turns out to be false, the customer can ask for refund and data related to the transaction is leveraged to train the model and increase the accuracy of any future predictions.

Compared to other existing pricing mechanisms, the proposed ML-based dOBP framework implements a two-step approach. That is, the service provider first provides a list of probability distributions and corresponding price quotes to the customer, and then provides a list of classes if the customer accepts the price quote. The proposed framework continually collects customer feedback data. The customer feedback data is then used to train the algorithm(s) used in the model, which can improve quality of the algorithm(s) by fine-tuning performance of the model. As such, service data stored in a cloud computing system is refined, and the service data can be stored, retrieved, or processed in a more efficient manner.

As an illustrative example, assume a service provider offers a service to clear documents for customers. If the service is charged on a PPU basis, pricing metrics are measured by a number of transactions, where a transaction refers to a total maximum number of documents and line items a customer sends to the service for processing per year. For example, one payment advice file (in pdf format) can be considered one transaction, and one incoming bank statement line item can be considered one transaction. A customer can pay for the service by blocks, where one block equals to 10,000 transactions, and minimum of 10 blocks for each service is required. The pricing is correlated to the number of blocks (for example, a customer pays $1.00 per transaction when the number of total transactions is less than 10,000 and $0.80 per transaction when the number of total transaction is greater than 10,000 but less than 50,000. When the number of total transaction is greater than 50,000, any additional transaction costs $0.60 per transaction)

On the other hand, in a dOBP scheme, a pricing metric is measured by an invoice matching predictions (that is, leveraging prediction business outcome to price the transaction). Here, for example, each prediction can have four different outcomes: 1) if the outcome is automated clearing, the list price is $5 per transaction; 2) if the outcome is assisted clearing, the list price is $2 per transaction; 3) if the outcome is no support, the list price is $0 per transaction (that is, no charge to the customer); and 4) if the outcome is wrong clearing, the list price is $-5 per transaction (that is, the $5 the customer previously paid for the service is refunded to the customer. In this case, the customer can ask for refund for false predictions).

From a customer's perspective, because the price she paid for a dOBP scheme is directed related to the quality of the service she received, while the price she paid for a PPU scheme only depends on the quantity of the service the provider performed, the former pricing scheme could provide a more satisfactory customer experience and be more welcomed to the customer.

FIG. 1 is an example diagram illustrating components/data relationship of the ML-based dOBP framework 100, according to some implementations of the present disclosure. FIG. 1 is provided for example purposes only to enhance understanding of the presented concepts. As will be appreciated for those of ordinary skill in the art, there is a myriad of possible ways to present or to arrange the presented components, to structure their interactions, or to describe inter/intra-component interactions/communications In as far as they are consistent with this disclosure, the other possible presentations or arrangements, structures, or descriptions are considered to be within the scope of this disclosure.

At high-level and in some implementations of a described ML-based dOBP framework 100, a Cloud Computing Platform (CCP) 102 (for example, an SAP™ Service Ticket Intelligence that has a text classification feature) is used to process service requests from a user 104. In some implementations, the user 104 can be an individual business owner, a small business, an organization that requests cloud computing data services, or other entity. In some implementations, the CCP 102 includes a Database Persistency 106 (for example, an SAP HANA in-memory database or other database) that is connected to a computing system and stores service data information of different Bizservices 108a, 108b, 108c, etc. (hereinafter as "Bizservice 108") the cloud platform offers to users. Each Bizservice 108 stores all service data and all historical data of user usage of a specific service. In some implementations, the Database Persistency 106 can store service data, historical service information, or context about the users in a computing system landscape. In some implementations, stored information can be analyzed by service intelligence functionality of the CCP 102 to make a prediction corresponding to a service request of a user 104. Note that use numbers (for example, 1, 1.0, 2.0, and 3.0) associated with connecting arrows in FIG. 1 are used for referential purposes to demonstrate one or more relationships between illustrated components.

As illustrated in FIG. 1, the CCP 102 includes a dOBP Broker 110. In some implementations, the dOBP Broker 110 includes a deep learning model architecture 112, which can include a prediction model that makes predictions based on the user information and service data. For example, the dOBP Broker 110 can be configured to receive a service request from user 104 (1.0), process the request based on service data of the BizService 108 (2.0), and return a service reply that includes a prediction probability distribution and price quote to the user 104 (3.0). Upon the receipt of the service reply, the user 104 can make a decision whether to accept the price quote and send the decision to the dOBP Broker 110. Based on the user's decision, the dOBP Broker 110 can proceed to further interact with the user 104 (5.0, 6.0, 7.0, 8.0, and 9.0), or to terminate the service (4.0 and 5.0).

In some implementations, CCP 102 further includes a Commercialization Framework 114, which is a standard product for some software service providers. The Commercialization Framework 114 is responsible for validating whether a specific customer has the authorization to access a specific service, tracking the usage of the customer for any authorized service, and billing the customer for his usage of the service.

Figure 2:
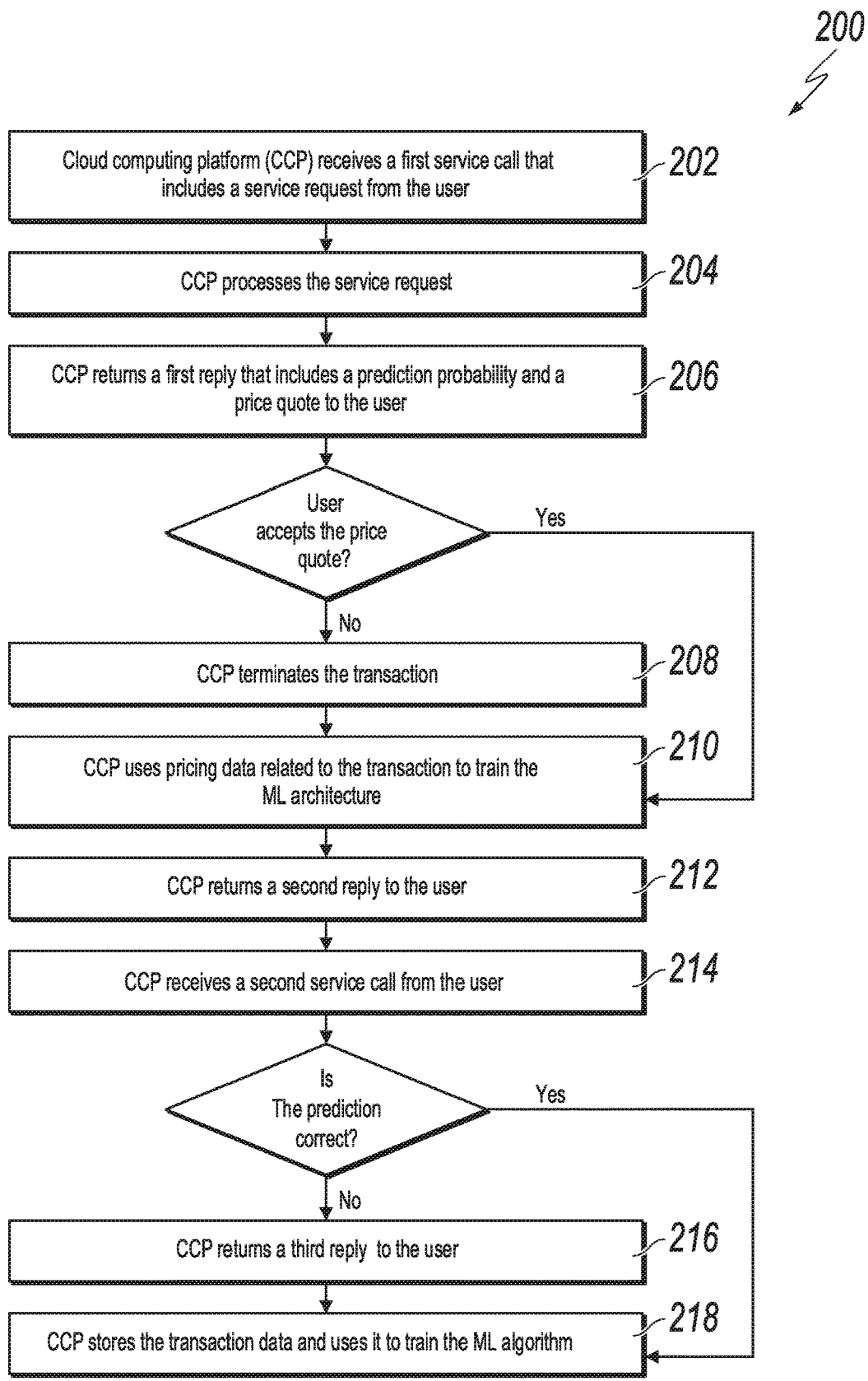
FIG. 2 is a flowchart of an example method for an ML-based dOBP operation, according to an implementation of the present disclosure.

FIG. 2 is a flowchart of an example method 200 for an ML-based dOBP operation, according to an implementation of the present disclosure. For illustration purposes, method 200 is illustrated in light of an example scenario of trade credit issuance, but is not limited to this scenario and is to be afforded the broadest application consistent with this description. Trade credit is a business financing option, where a supplier fronts inventory to customers and provides a predetermined period of time in which to pay for the inventory. Trade credit is a common practice among businesses that serve other businesses (that is, Business-to-Business or B2B). Under trade credit agreements, buyers receive needed inventory and supplies immediately without having to pay until an agreed-upon future date. The supplier takes assumes risk that a buyer may fail to pay for received goods. Therefore, suppliers need to access business credit scores of buyers (that is, requesting a financing service provider to predict, "Will buyer X pay an invoice on time?") prior to making any advance of goods to buyers.

For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, (1.0) a service call is received at a CCP 102 from a user 104. The user 104 subscribes to one or more services provided by the CCP 102. In some implementations, before the user makes the service call, the CCP 102 authenticates the identity of the user 104 to confirm his subscription.

In some implementations, the service call includes a service request, including user information, the service type, and other related information of the service. For example, in January 2019, user 104 made a service call to the CCP 102, and the service call included the following information:

Customer name: New unknown customer
PO Amount: $100,000
Due Date: February 2019.

This service call indicates that the user wishes to know whether a $100,000 purchase order issued to the new unknown customer will be repaid on time (as of the due date on February 2019). In some implementations, the service call can include more or different data information that enables the service provider to identify the new unknown customer. For example, the service call can includes the name, address, social security number, and customer number of the unknown new customer. Service provider uses this data information to identify the unknown new customer and check, for example, business history and payment track record in a database of the service provider. Based on historical records, the service provider can make an accurate prediction as to whether the customer will pay an invoice on time.

At 204, (2.0) the dOBP Broker 110 included in the CCP 102, based on the received service call, accesses one of the BizService 108 in the Data Persistency 106, and retrieves corresponding service data (for example, historical service data associated with the user). In this illustrated example, the BizService 108 can connect to outside credit bureaus and agencies (for example, a background check company) to access the new unknown customer's credit history. In some implementations, the dOBP Broker 110 can also access its internal database to check whether there is historical credit data related to the new unknown customer. After gathering needed information, the dOBP Broker 110 can generate a prediction for the requested service using the deep learning model architecture 112.

At 206, (3.0) a first reply is returned to the user 104 from the CCP 102. The first reply includes a prediction probability and a corresponding price quote for that prediction probability. For example, the first reply can be:

Prediction Probability: 98%

Prediction Price: $50.00.

This reply shows the CCP 104 predicts the probability of the user 104's request is 98%, and if the user 104 wants to learn the result of the prediction, she has to pay $50.00 for the service.

If the user 104 declines the price quote, method 200 proceeds to 208.

At 208, (4.0) the transaction is terminated.

At 210, (5.0) pricing data related to this transaction is used as input to train the ML architecture 112. The greater the prediction probability is (which shows higher confidence the service provider has in its prediction result), the greater the price quote the service will charge the user. Therefore, data associated with a failed transaction would help to train the ML architecture 112 to better pricing its service in the future.

Returning to 206, if the user 104 accepts the price quote, method 200 proceeds to 212. Because the data related to an accepted price quote also benefits further pricing, data related to this transaction can also be used as input to train the ML architecture 112 (as illustrated at 210).

At 212, (6.0) a second reply is returned to the user 104 from the CCP 102. The second reply includes the prediction probability and the detailed prediction made by the dOBP Broker 110. In some implementations, the second reply also includes an insurance amount. For example, the second reply can be:

Prediction probability: 98%
Prediction: pay on time
Insurance Price: $2,100.00.

This reply shows the CCP 102 predicts that there is a 98% probability this unknown new customer will pay back his invoice to the user 104 on time. If the prediction is wrong (that is, the unknown new customer fails to pay on time), the service provider will compensate the user 104 for $2,100.0. In some implementations, the insurance premium is determined by the prediction probability and the risk size. For example, if the invoice bill is for $100,000 and the system makes a prediction that has a 99% probability, the insurance premium is $1,000. The service provider may choose to add a dynamic amount and adjust the insurance premium based on demand and supply of the market to maximize its profit from the insurance service.

After a predetermined time period (for example, after a due date of an invoice), the transaction resumes and continues. At 214, (7.0) the user 104 makes a second service call to the CCP 102, to inform whether the previous prediction is correct. For example, in February 2019, the user makes the second service call as:

Customer name: New Unknown Customer
Payment: Customer didn't pay.

This second service call shows that unlike what was predicted by the service provider, the new unknown customer did not pay back his invoice on time.

If the prediction is correct, method 200 proceeds to 218. Otherwise, method 200 proceeds to 216.

At 216, (8.0) the CCP 102 makes a third reply to issue a refund to the prediction price previously charged to the user 104. In some implementations, if the second reply contains an insurance amount, the CCP 102 also compensates the customer with the insured amount.

At 218, (9.0) all data related to this transaction is collected, stored, and used to further train the ML architecture 112. For example, credit data indicating whether the new unknown customer is reliable is stored in the database. In this way, if a similar service inquiry related to this new unknown customer is made by another user, the stored data can be directly retrieved and used to train the ML architecture to generate a more accurate prediction.

Figure 3:
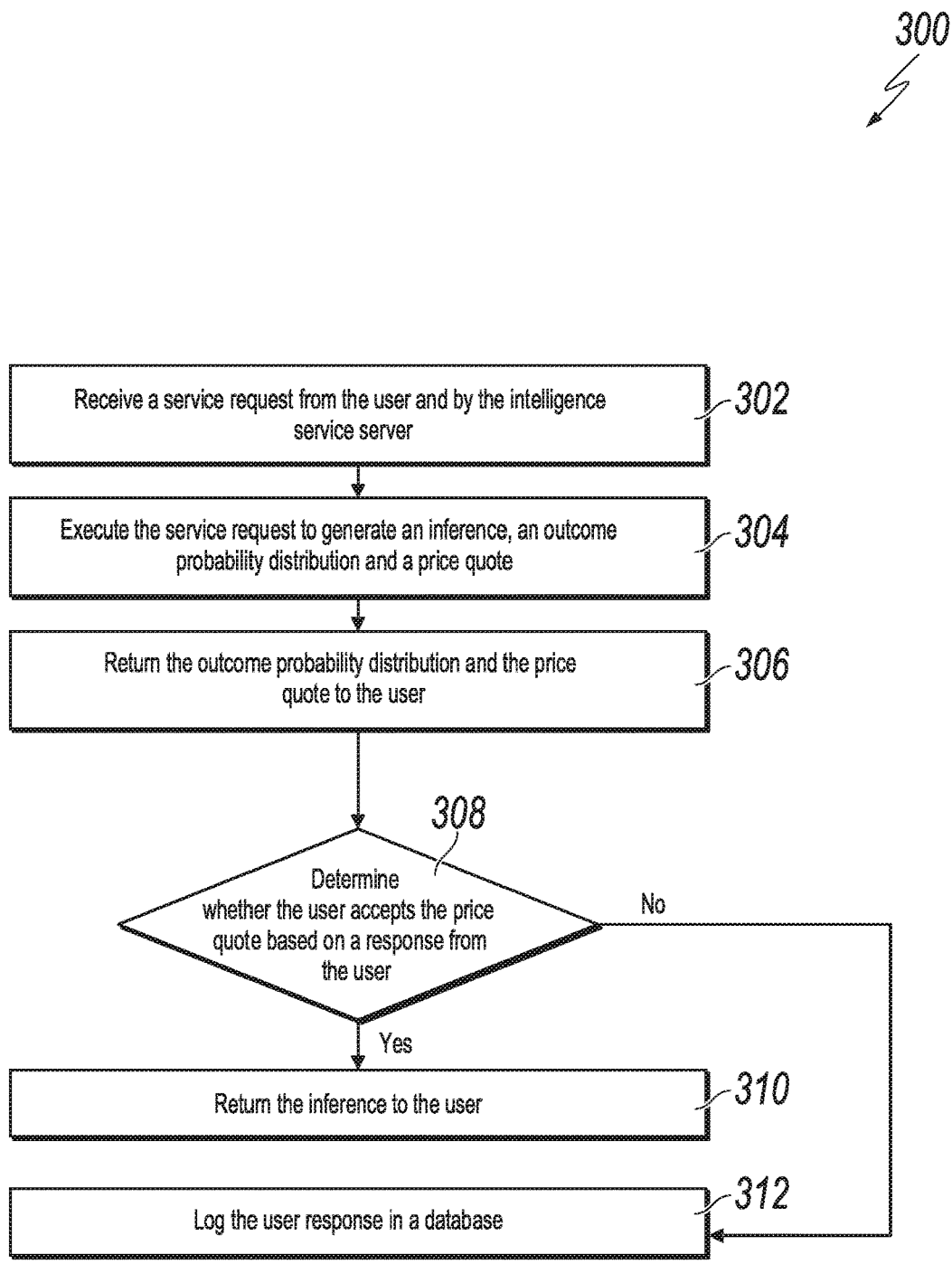
FIG. 3 is a flowchart illustrating an example of a computer-implemented method for performing operations on virtual machines of the virtual machine pooling service and providing the virtual machines to a client, according to an implementation of the present disclosure.

FIG. 3 is a flowchart illustrating an example of a computer-implemented method 300 for performing operations on virtual machines of the virtual machine pooling service and providing the virtual machines to a client, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, a service request is received at an intelligence service server from a user, where the service request comprises a plurality of required inputs associated with the user. In some implementations, the user is subscribed to a service the intelligence service server provides, and the user allocates credits to the intelligence service server for the service. After 302, method 300 proceeds to 304.

At 304, the plurality of required inputs are executed by the intelligence service server to generate an inference, an outcome probability distribution, and a price quote, where the price quote corresponds to the outcome probability distribution. In some implementations, the intelligence service server executes the required inputs based on a machine-learning classification model. After 304, method 300 proceeds to 306.

At 306, the outcome probability distribution and the price quote are returned by the intelligence service server to the user. In some implementations, a greater probability corresponds to a greater price quote. After 306, method 300 proceeds to 308.

At 308, it is determined by the intelligence service server, whether the user accepts the price quote based on a response from the user.

At 310, if it is determined that the user accepts the price quote, the inference is returned to the user.

In some implementations, the method 300 further includes, recording a transaction associated with the inference; and deducting a price from the credits the user allocated to the intelligence service server.

In some implementations, method 300 further includes, receiving feedback from the user, where the feedback indicates whether the inference is true. If it is determined that the inference is not true, the price is refunded to the credits the user allocated to the intelligence service server.

At 312, if it is determined that the user declines the price quote, the response from the user is logged by the intelligence service server in a database associated with the intelligence service server.

In some implementations, method 300 further includes, input of feedback data from the user to train the machine-learning classification model. After 312, method 300 can stop.

Figure 4:
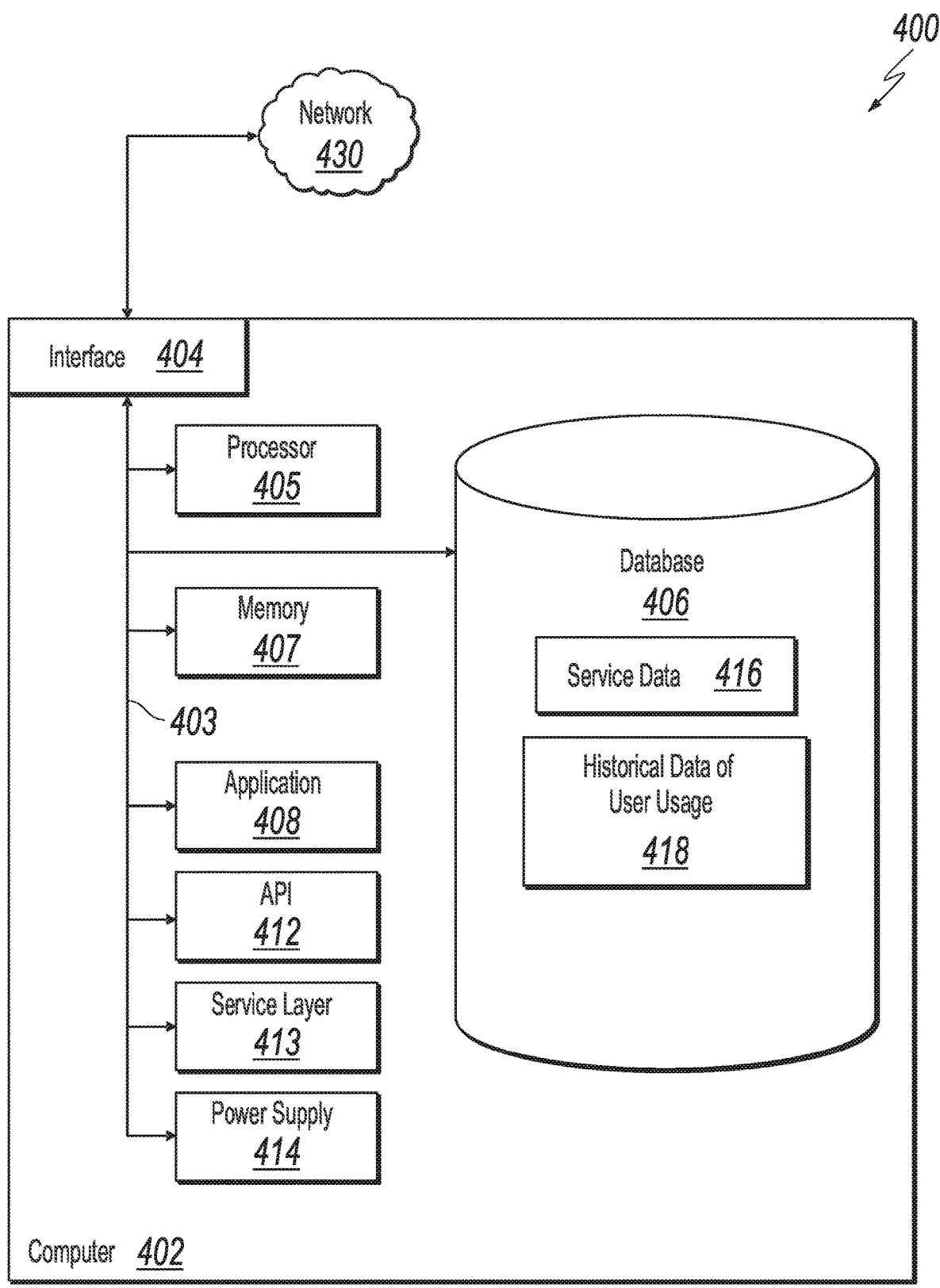
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 402 can include an input device, such as a keypad, keyboard, or touch screen, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as, for example, a client, network component, a server, or a database or another persistency, or a combination of roles for performing the subject matter described in the present disclosure. The illustrated Computer 402 is communicably coupled with a Network 430. In some implementations, one or more components of the Computer 402 can be configured to operate within an environment, or a combination of environments, including cloud computing, local, or global.

At a high level, the Computer 402 is an electronic computing device operable to receive, transmit, process, store, or manage data and information associated with the described subject matter. According to some implementations, the Computer 402 can also include or be communicably coupled with a server, such as an application server, e-mail server, web server, caching server, or streaming data server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 404. Although illustrated as a single Processor 404, two or more Processors 404 can be used according to particular needs, desires, or particular implementations of the Computer 402. Generally, the Processor 404 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory or conventional database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. As illustrated, the Database 406 holds the previously described data for the user such as service data 416, and historical data of user usage 418.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method, including a service request is received at an intelligence service server from a user, where the service request includes a number of required inputs associated with the user. The number of required inputs are executed by the intelligence service server to generate an inference, an outcome probability distribution and a price quote, where the price quote corresponds to the outcome probability distribution. The outcome probability distribution and the price quote are returned by the intelligence service server to the user. It is determined by the intelligence service server that whether the user accepts the price quote based on a response from the user. If it is determined that the user accepts the price quote, the inference is returned by the intelligence service server to the user. If it is determined that the user declines the price quote, the response from the user is logged in a database associated with the intelligence service server by the intelligence service server.

The foregoing and other described implementations can each, optionally, include one or more of the following features:

A first feature, combinable with any of the following features, where the user is subscribed to a service the intelligence service server provides, and where the user allocates credits to the intelligence service server for the service.

A second feature, combinable with any of the previous or following features, where the user accepts the price quote, and further including: recording a transaction associated with the inference; and deducting a price from the credits the user allocated to the intelligence service server.

A third feature, combinable with any of the previous or following features, further including receiving a feedback from the user, where the feedback indicates whether the inference is true; and if it is determined that the inference is not true, refunding the price to the credits the user allocated to the intelligence service server.

A fourth feature, combinable with any of the previous or following features, where a greater probability corresponds to a greater price quote.

A fifth feature, combinable with any of the previous or following features, where the intelligence service server executes the required inputs based on a machine-learning classification model.

A sixth feature, combinable with any of the previous or following features, further including inputting feedback data from the user to train the machine-learning classification model.

In a second implementation, a non-transitory, computer-readable medium storing one or more instructions executable by a computer system to perform operations including a service request is received at an intelligence service server from a user, where the service request includes a number of required inputs associated with the user. The number of required inputs are executed by the intelligence service server to generate an inference, an outcome probability distribution and a price quote, where the price quote corresponds to the outcome probability distribution. The outcome probability distribution and the price quote are returned by the intelligence service server to the user. It is determined by the intelligence service server that whether the user accepts the price quote based on a response from the user. If it is determined that the user accepts the price quote, the inference is returned by the intelligence service server to the user. If it is determined that the user declines the price quote, the response from the user is logged in a database associated with the intelligence service server by the intelligence service server.

The foregoing and other described implementations can each, optionally, include one or more of the following features:

A first feature, combinable with any of the following features, where the user is subscribed to a service the intelligence service server provides, and where the user allocates credits to the intelligence service server for the service.

A second feature, combinable with any of the previous or following features, where the user accepts the price quote, and further including recording a transaction associated with the inference; and deducting a price from the credits the user allocated to the intelligence service server.

A third feature, combinable with any of the previous or following features, further including receiving a feedback from the user, where the feedback indicates whether the inference is true; and if it is determined that the inference is not true, refunding the price to the credits the user allocated to the intelligence service server.

A fourth feature, combinable with any of the previous or following features, where a greater probability corresponds to a greater price quote.

A fifth feature, combinable with any of the previous or following features, where the intelligence service server executes the required inputs based on a machine-learning classification model.

A sixth feature, combinable with any of the previous or following features, further including inputting feedback data from the user to train the machine-learning classification model.

In a third implementation, a computer-implemented system, comprising, one or more computers; and one or more computer memory devices interoperably coupled with the one or more computers and having tangible, non-transitory, machine-readable media storing one or more instructions that, when executed by the one or more computers, perform one or more operations including a service request is received at an intelligence service server from a user, where the service request includes a number of required inputs associated with the user. The number of required inputs are executed by the intelligence service server to generate an inference, an outcome probability distribution and a price quote, where the price quote corresponds to the outcome probability distribution. The outcome probability distribution and the price quote are returned by the intelligence service server to the user. It is determined by the intelligence service server that whether the user accepts the price quote based on a response from the user. If it is determined that the user accepts the price quote, the inference is returned by the intelligence service server to the user. If it is determined that the user declines the price quote, the response from the user is logged in a database associated with the intelligence service server by the intelligence service server.

The foregoing and other described implementations can each, optionally, include one or more of the following features:

A first feature, combinable with any of the following features, where the user is subscribed to a service the intelligence service server provides, and where the user allocates credits to the intelligence service server for the service.

A second feature, combinable with any of the previous or following features, where the user accepts the price quote, and further including recording a transaction associated with the inference; and deducting a price from the credits the user allocated to the intelligence service server.

A third feature, combinable with any of the previous or following features, further including receiving a feedback from the user, where the feedback indicates whether the inference is true; and if it is determined that the inference is not true, refunding the price to the credits the user allocated to the intelligence service server.

A fourth feature, combinable with any of the previous or following features, where a greater probability corresponds to a greater price quote.

A fifth feature, combinable with any of the previous or following features, where the intelligence service server executes the required inputs based on a machine-learning classification model.

A sixth feature, combinable with any of the previous or following features, further including inputting feedback data from the user to train the machine-learning classification model.

The previously described first implementation can also be implemented using a non-transitory, computer-readable medium storing one or more instructions executable by a computer system to perform to perform the computer-implemented method; and a computer-implemented system comprising one or more computers and one or more computer memory devices interoperably coupled with the one or more computers and having tangible, non-transitory, machine-readable media storing one or more instructions that, when executed by the one or more computers, perform the computer-implemented method/the computer-readable instructions stored on the non-transitory, computer-readable medium.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving, at an intelligence service server, a service request from a user, wherein the service request comprises a plurality of required inputs associated with the user, wherein the intelligence service server executes the required inputs based on a machine-learning classification model, and wherein the user allocates credits to the intelligence service server for a service that is requested through the service request;
executing, by the intelligence service server, the plurality of required inputs to generate an inference comprising an insurance amount for a plurality of outcomes, an outcome probability distribution, and a price quote, wherein the outcome probability distribution comprises the plurality of outcomes and indicates a respective probability of each of the plurality of outcomes of the service that is requested to be accomplished within a predetermined period of time and the price quote corresponds to the outcome probability distribution relative to computing resources expected to be used for each of the plurality of outcomes to complete the service;
returning, by the intelligence service server, the outcome probability distribution and the price quote to the user;
determining, by the intelligence service server, that the user accepts the price quote based on a response from the user;
in response to determining that the user accepts the price quote, returning, by the intelligence service server, the inference to the user;
recording a transaction associated with the inference;
deducting a price from the credits the user allocated to the intelligence service server;
receiving a feedback from the user, wherein the feedback indicates whether the inference is true; and
if it is determined that the inference is not true, refunding the price to the credits the user allocated to the intelligence service server.

2. The computer-implemented method of claim 1, wherein the user is subscribed to the service the intelligence service server provides.

3. The computer-implemented method of claim 1, wherein the insurance amount is adjusted based on a demand and a supply of the intelligence service server.

4. The computer-implemented method of claim 1, further comprising:
if it is determined that the inference is not true, compensating the user with the insurance amount.

5. The computer-implemented method of claim 1, wherein a greater probability of the outcome probability distribution corresponds to a greater price quote.

6. The computer-implemented method of claim 1, further comprising:

inputting the feedback from the user to train the machine-learning classification model.

7. A non-transitory, computer-readable medium storing one or more instructions executable by a computer system to perform operations comprising:
receiving, at an intelligence service server, a service request from a user, wherein the service request comprises a plurality of required inputs associated with the user, wherein the intelligence service server executes the required inputs based on a machine-learning classification model, and wherein the user allocates credits to the intelligence service server for a service that is requested through the service request;
executing, by the intelligence service server, the plurality of required inputs to generate an inference comprising an insurance amount for a plurality of outcomes, an outcome probability distribution, and a price quote, wherein the outcome probability distribution comprises the plurality of outcomes and indicates a respective probability of each of the plurality of outcomes of the service that is requested to be accomplished within a predetermined period of time and the price quote corresponds to the outcome probability distribution relative to computing resources expected to be used for each of the plurality of outcomes to complete the service;
returning, by the intelligence service server, the outcome probability distribution and the price quote to the user;
determining, by the intelligence service server, that the user accepts the price quote based on a response from the user;
in response to determining that the user accepts the price quote, returning, by the intelligence service server, the inference to the user;
recording a transaction associated with the inference;
deducting a price from the credits the user allocated to the intelligence service server;
receiving a feedback from the user, wherein the feedback indicates whether the inference is true; and
if it is determined that the inference is not true, refunding the price to the credits the user allocated to the intelligence service server.

8. The non-transitory, computer-readable medium of claim 7, wherein the user is subscribed to the service the intelligence service server provides.

9. The non-transitory, computer-readable medium of claim 7, wherein the insurance amount is adjusted based on a demand and a supply of the intelligence service server.

10. The non-transitory, computer-readable medium of claim 7, further comprising:
if it is determined that the inference is not true, compensating the user with the insurance amount.

11. The non-transitory, computer-readable medium of claim 7, wherein a greater probability of the outcome probability distribution corresponds to a greater price quote.

12. The non-transitory, computer-readable medium of claim 7, further comprising:
inputting the feedback from the user to train the machine-learning classification model.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at an intelligence service server, a service request from a user, wherein the service request comprises a plurality of required inputs associated with the user, wherein the intelligence service server executes the required inputs based on a machine-learning classification model, and wherein the user allocates credits to the intelligence service server for a service that is requested through the service request;
executing, by the intelligence service server, the plurality of required inputs to generate an inference comprising an insurance amount for a plurality of outcomes, an outcome probability distribution, and a price quote, wherein the outcome probability distribution comprises the plurality of outcomes and indicates a respective probability of each of the plurality of outcomes of the service that is requested to be accomplished within a predetermined period of time and the price quote corresponds to the outcome probability distribution relative to computing resources expected to be used for each of the plurality of outcomes to complete the service;
returning, by the intelligence service server, the outcome probability distribution and the price quote to the user;
determining, by the intelligence service server, that the user accepts the price quote based on a response from the user;
in response to determining that the user accepts the price quote, returning, by the intelligence service server, the inference to the user;
recording a transaction associated with the inference;
deducting a price from the credits the user allocated to the intelligence service server;
receiving a feedback from the user, wherein the feedback indicates whether the inference is true; and
if it is determined that the inference is not true, refunding the price to the credits the user allocated to the intelligence service server.

14. The computer-implemented system of claim 13, wherein the user is subscribed to the service the intelligence service server provides.

15. The computer-implemented system of claim 13, wherein the insurance amount is adjusted based on a demand and a supply of the intelligence service server.

16. The computer-implemented system of claim 13, further comprising:
if it is determined that the inference is not true, compensating the user with the insurance amount.

17. The computer-implemented system of claim 13, further comprising:
inputting the feedback from the user to train the machine-learning classification model.

* * * * *